US008477717B2

(12) United States Patent
Kojima

(10) Patent No.: US 8,477,717 B2
(45) Date of Patent: Jul. 2, 2013

(54) BASE STATION OF MOBILE COMMUNICATION SYSTEM

(75) Inventor: Yuji Kojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 984 days.

(21) Appl. No.: 12/129,758

(22) Filed: May 30, 2008

(65) Prior Publication Data

US 2009/0109923 A1 Apr. 30, 2009

(30) Foreign Application Priority Data

Oct. 26, 2007 (JP) ................................ 2007-279200

(51) Int. Cl.
*H04W 4/00* (2009.01)
(52) U.S. Cl.
USPC .......... 370/331; 455/432.1; 455/436; 455/445
(58) Field of Classification Search
None
See application file for complete search history.

(56) References Cited

U.S. PATENT DOCUMENTS

| 7,515,559 | B2* | 4/2009 | Koo et al. | 370/328 |
| 7,877,093 | B2* | 1/2011 | Lee et al. | 455/436 |
| 2003/0198179 | A1 | 10/2003 | Koo et al. | |
| 2004/0176094 | A1* | 9/2004 | Kim et al. | 455/438 |
| 2005/0101326 | A1 | 5/2005 | Kang et al. | |
| 2005/0101328 | A1* | 5/2005 | Son et al. | 455/436 |
| 2005/0117539 | A1* | 6/2005 | Song et al. | 370/328 |
| 2005/0195791 | A1* | 9/2005 | Sung et al. | 370/342 |
| 2006/0009228 | A1 | 1/2006 | Kang et al. | |
| 2006/0030309 | A1* | 2/2006 | Lee et al. | 455/422.1 |
| 2006/0079235 | A1 | 4/2006 | Kim | |
| 2006/0111111 | A1* | 5/2006 | Ovadia | 455/439 |
| 2006/0209734 | A1* | 9/2006 | Son et al. | 370/312 |
| 2007/0191009 | A1* | 8/2007 | Hong et al. | 455/436 |
| 2007/0238464 | A1* | 10/2007 | Lim et al. | 455/436 |
| 2008/0031128 | A1* | 2/2008 | Jang et al. | 370/210 |

FOREIGN PATENT DOCUMENTS

| JP | 2003-318859 | 11/2003 |
| JP | 2006-005946 | 1/2006 |
| JP | 2007-504747 | 3/2007 |
| KR | 2006-97506 | 9/2006 |
| WO | WO 2007/078138 | 7/2007 |
| WO | WO 2007/100224 | 9/2007 |

OTHER PUBLICATIONS 802.16 IEEE Standard for local and metropolitan area networks: Part 16, IEEE Computer Society and the IEEE Microwave Theory and Techniques Society, Oct. 1, 2004; pp. 1-895.
802.16e IEEE Standard for local and metropolitan area networks:Part 16; Amendment 2, IEEE Computer Society and the IEEE Microwave Theory and Techniques Society, Feb. 28, 2006; pp. 1-864.

(Continued)

*Primary Examiner* — Ian N. Moore
*Assistant Examiner* — Brian T Le
(74) *Attorney, Agent, or Firm* — IPUSA, PLLC

(57) ABSTRACT

A base station of a mobile communication system which allocates a bandwidth for handover ranging or bandwidth request ranging in response to a code transmitted from a mobile station that is selected by the mobile station from a plurality of codes includes a ranging allocating unit configured to allocate, to a mobile station performing handover, at least one of a dedicated ranging code and a dedicated ranging slot that are exclusively used and not used by any mobile stations other than the mobile station, and that are provided separately for each of a plurality of base stations to which the mobile station is to be possibly connected.

10 Claims, 14 Drawing Sheets

OTHER PUBLICATIONS

Office Action for Korean Patent Application No. 10-2008-59177, mailed Mar. 30, 2010.
Itzik Shahar et at., Coordinated association during scanning, IEEE C802.16e-051143r7, May 4, 2005, Whole Text, URL, http://www.ieee802.org/16/tge/contrib/C80216e-05_143r7.pdf.
Office Action dated May 22, 2012 issued with respect to the basic Japanese Patent Application No. 2007-279200.
Extended European Search Report dated Mar. 18, 2013 issued with respect to the corresponding European Patent Application No. 08157239.8.

* cited by examiner

FIG.10

| Syntax | Notes |
|---|---|
| MOB_BSHO-RSP_Message_format() { | |
| Management Message Type=58 | |
| ........ | OMITTED |
| N_Recommended | NUMBER OF TARGET BASE STATIONS |
| For (j=0; j < N_Recommended; j++) { | |
| Neighbor BSID | TARGET BASE STATION IDENTIFIER |
| <u>Ranging Code index</u> | DEDICATED RANGING CODE INDEX AVAILABLE FOR TARGET BASE STATION |
| <u>Ranging Slot</u> | DEDICATED RANGING SLOT NUMBER AVAILABLE FOR TARGET BASE STATION |
| <u>Ranging Frame Window</u> | LENGTH OF EFFECTIVE FRAME SET FOR TARGET BASE STATION |
| ........ | OMITTED |
| } | |
| ........ | OMITTED |
| Action Time | INDICATION OF FRAME FOR TARGET BASE STATION |
| <u>Ranging Code index</u> | DEDICATED RANGING CODE INDEX AVAILABLE FOR LOCAL BASE STATION |
| <u>Ranging Slot</u> | DEDICATED RANGING SLOT NUMBER AVAILABLE FOR LOCAL BASE STATION |
| <u>Ranging Frame Window</u> | LENGTH OF EFFECTIVE FRAME SET FOR LOCAL BASE STATION |
| } | |

(※) NEWLY ADDED PARAMETERS UNDERLINED

FIG.11

| Syntax | Notes |
|---|---|
| UL-MAP-IE() { | |
| CID | CONNECTION ID = VALUE OF BROADCAST CID |
| UIUC=12 | VALUE BEING "12" WHEN SPECIFYING RANGING REGION |
| ............ | OMITTED |
| else if (UIUC=12) { | |
| OFDMA Symbol offset | OFFSET OF FIRST SYMBOL OF RANGING REGION |
| Subchannel offset | OFFSET OF FIRST SUBCHANNEL OF RANGING REGION |
| No. OFDMA Symbols | NUMBER OF SYMBOLS IN RANGING REGION |
| No. Subchannels | NUMBER OF SUBCHANNELS IN RANGING REGION |
| ............ | OMITTED |
| <u>N_Allocated Ranging Params</u> | NUMBER OF ALREADY-ALLOCATED DEDICATED RANGING ALLOCATION INFORMATION PIECES |
| for (j=0; j < N_Allocated_Ranging_Params; j++) { | |
| <u>Ranging Code index</u> | ALREADY-ALLOCATED DEDICATED RANGING CODE INDEX |
| <u>Ranging Slot</u> | ALREADY-ALLOCATED DEDICATED RANGING SLOT NUMBER |
| } | |
| ............ | OMITTED |
| } | |

(※) NEWLY ADDED PARAMETERS UNDERLINED

FIG.13

| Syntax | Notes |
|---|---|
| MOB_RNG-ALLOC_Message_format() { | |
| Management Message Type | MESSAGE TYPE OF MOB_RNG-ALOC MESSAGE |
| Target BS' s Ranging Code index | DEDICATED RANGING CODE INDEX AVAILABLE FOR TARGET BASE STATION |
| Target BS' s Ranging Slot | DEDICATED RANGING SLOT NUMBER AVAILABLE FOR TARGET BASE STATION |
| Target BS' s Ranging Frame Window | LENGTH OF EFFECTIVE FRAME SET FOR TARGET BASE STATION |
| Serving BS' s Ranging Code index | DEDICATED RANGING CODE INDEX AVAILABLE FOR LOCAL BASE STATION |
| Serving BS' s Ranging Slot | DEDICATED RANGING SLOT NUMBER AVAILABLE FOR LOCAL BASE STATION |
| Serving BS' s Ranging Frame Window | LENGTH OF EFFECTIVE FRAME SET FOR LOCAL BASE STATION |
| } | |

(※) NEWLY ADDED PARAMETERS UNDERLINED

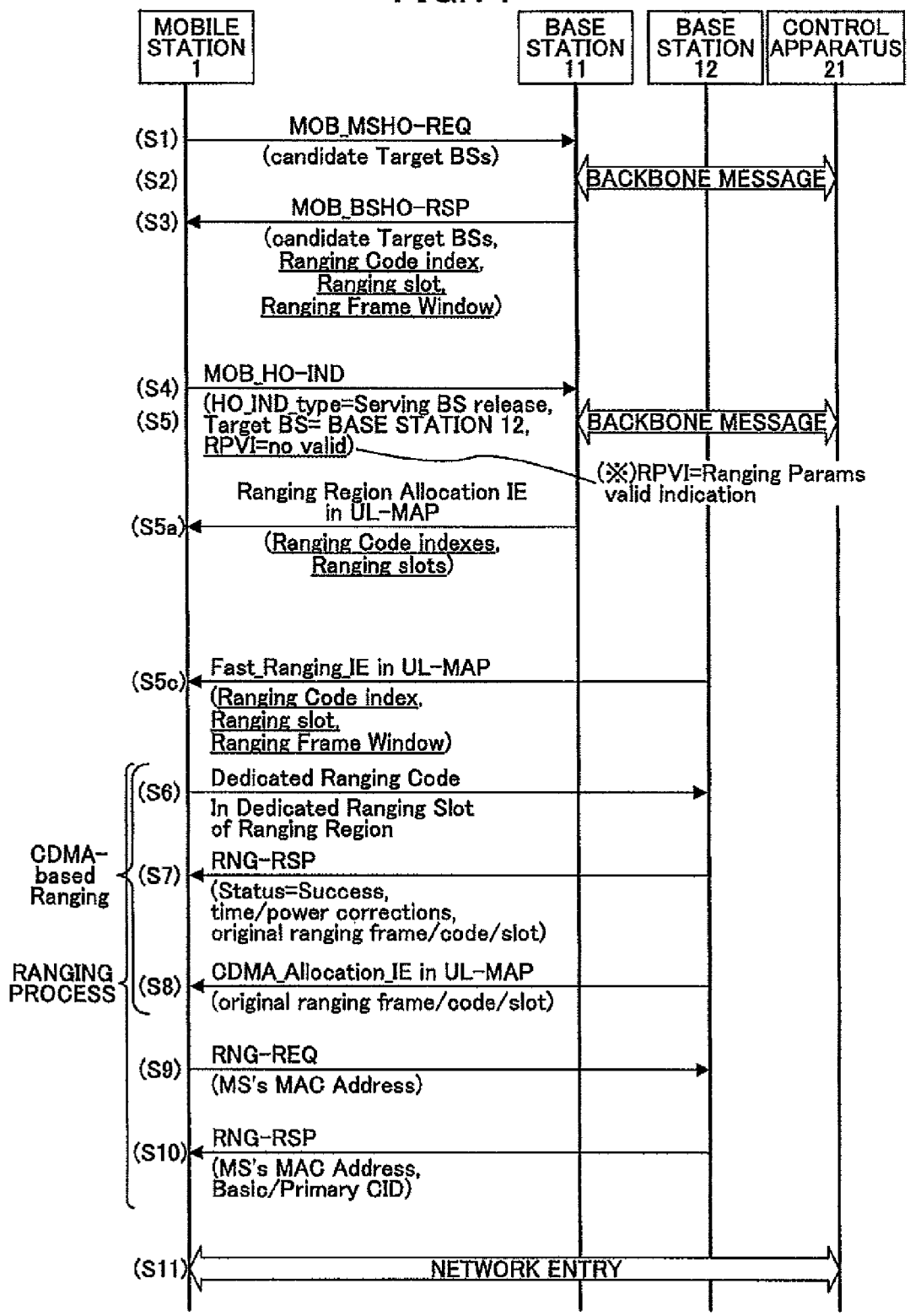

BASE STATION OF MOBILE COMMUNICATION SYSTEM

CROSS-REFERENCE TO RELATED APPLICATIONS

The present application is based upon and claims the benefit of priority from the prior Japanese Patent Application No. 2007-279200 filed on Oct. 26, 2007, with the Japanese Patent Office, the entire contents of which are incorporated herein by reference.

BACKGROUND OF THE INVENTION

1. Field of the Invention

The disclosures herein generally relate to base stations for mobile communication systems, and particularly relate to a base station for a mobile communication system in which a mobile station selects a code from a plurality of codes for transmission, and the base station allocates bandwidths for handover ranging or bandwidth request ranging in response to the transmitted code.

2. Description of the Related Art

In recent years, IEEE (Institute of Electrical and Electronic Engineers) has been engaged in an effort to standardize a mobile communication system referred to as WiMAX (Worldwide Interoperability for Microwave Access).

WiMAX includes IEEE802.16d that is a standard for a stationary subscriber station and IEEE802.16e that is a standard for a mobile station.

The disclosures herein relate to a ranging method for use in IEEE802.16e, i.e., the standard for mobile stations, for example. The term "ranging" refers to the adjustment of transmission timing and PHY (i.e., physical layer) functions (such as adjustment of a transmission power level) performed by a mobile station based on checking radio communication conditions between the mobile station and a base station.

IEEE802.16e defines several PHY systems. The following purpose-specific ranging procedures are provided for an OFDMA (Orthogonal Frequency Division Multiple Access) PHY:

(1) Initial Ranging: ranging performed by a mobile station when it first connects to a base station;
(2) Periodic Ranging: ranging performed at constant intervals by a mobile station that is already connected to a base station;
(3) Bandwidth Request Ranging (BR Ranging): ranging performed by a mobile station when it requests a bandwidth; and
(4) Handover Ranging: ranging performed by a mobile station performing handover with respect to a base station that is to be a handover destination.

FIG. 1 is a drawing showing an example of a frame configuration for an OFDMA physical layer. In FIG. 1, the horizontal axis represents the OFDMA symbol number, which corresponds to a time axis. The vertical axis represents the subchannel logical number.

The OFDMA frame includes a DL (i.e., downlink: downward link from a base station to a mobile station) subframe, a UL (i.e., uplink: upward link from a mobile station to a base station) subframe, a TTG (Transmit/receive Transition Gap), and a RTG (Receive/transmit Transition Gap).

The DL subframe includes a preamble, an FCH (Frame Control Header), a DL-MAP, a UL-MAP, and a plurality of DL bursts.

The preamble includes a preamble pattern required by a mobile station to establish frame synchronization. The FCH includes information about subchannels used and information about the DL-MAP that is provided at the immediately following position. The DL-MAP includes mapping information regarding the DL bursts in the DL subframe. By referring to this information, a mobile station can identify a UL-MAP (transmitted on a DL burst #1) and DL bursts #2 through #6 shown in FIG. 1.

The UL-MAP includes mapping information regarding the ranging regions and UL bursts in the UL subframe. By referring to this information, a mobile station can identify the ranging regions and UL bursts #1 through #4 shown in FIG. 1.

The burst is an area throughout which the same modulation scheme and the same FEC (Forward Error Correction) are used in combination. The DL-MAP/UL-MAP specifies a combination of a modulation scheme and an FEC for a given burst. The burst carries various control messages defined in IEEE802.16e and user data.

For performing ranging, a mobile station first randomly selects a code from 256 PN (i.e., pseudo noise) codes each having a 144-bit length, and modulates the code by BPSK (Binary Phase Shift Keying) for transmission to a base station by use of a ranging region shown in FIG. 1. This code is referred to as a "ranging code" or "CDMA ranging code" (CDMA: Code Division Multiple Access).

In FIG. 1, a ranging region for initial ranging or handover ranging and a ranging region for periodic ranging or bandwidth request ranging are separately allocated. A mobile station uses either region for transmission of a ranging code in accordance with the purpose of ranging. Each ranging region is allocated as shown in FIG. 1 as defined by the UL-MAP.

In the following, procedures for bandwidth request ranging and handover ranging will be described.

FIG. 2 is a drawing showing the configuration of a typical network. The configuration shown in FIG. 2 includes mobile stations 1 through 4, base stations 11 and 12, a control apparatus 21, and a core network 22. The control apparatus 21 manages and controls a plurality of base stations, and serves to connect between the base stations as well as between the base stations and the core network.

In FIG. 2, the mobile station 1 is performing handover from the base station 11 functioning as a serving base station (serving BS) to the base station 12 that is a target base station (target BS). The mobile station 2 attempts to handover from the base station 11, but cancels the handover to return to the base station 11. Procedures for handover ranging and bandwidth request ranging in these cases will be described by referring to FIG. 3 and FIG. 4.

FIG. 3 is a drawing showing the procedure for related-art handover ranging.

In step S1, the mobile station 1 transmits a handover request (i.e., MOB_MSHO-REQ message) including an indication of a plurality of candidate target base stations to the base station 11.

In step S2, the base station 11, the control apparatus 21, and the base station 12 exchange required backbone messages upon receiving the handover request.

In step S3, the base station 11 transmits a handover response (i.e., MOB_BSHO-RSP message) including an indication of a plurality of candidate target base stations capable of handover to the mobile station 1. The target base stations identified in step S3 may possibly be different from the target base stations identified in step S1 as a result of the exchanges of backbone messages.

In step S4, the mobile station 1 transmits, to the base station 11, a handover indication (i.e., MOB_HO-IND) indicating that the base station 12 is selected as the target base station. In so doing, HO_IND_type of MOB_HO-IND is set to "Serving BS release", so that the connection between the mobile station 1 and the base station 11 will be disconnected.

In step S5, the base station 11, the control apparatus 21, and the base station 12 exchange required backbone messages upon receiving the handover indication.

In step S6, the mobile station 1 transmits a handover ranging code during a ranging slot of a ranging region shown in FIG. 1 to the base station 12. The 256 ranging codes previously described have their usages defined on a purpose-specific basis (i.e., for initial ranging, periodic ranging, bandwidth request ranging, and handover ranging). In step S6, a ranging code defined for handover is used. The purpose-specific usage of a ranging code is defined by a UCD (Uplink Channel Descriptor) message that is periodically broadcast from a base station. The base station 12 identifies the purpose of ranging based on the received ranging code.

FIG. 5 is a drawing showing an example of the configuration of a ranging region. What is shown in FIG. 5 corresponds to the detail of a ranging region shown in FIG. 1. In FIG. 5, N1 represents OFDMA symbol numbers for a single ranging slot, and N2 represents subchannel numbers for a single ranging slot. A remainder of the region that does not have a sufficient number of symbols to constitute a single ranging slot is not allocated to a ranging slot, and is not used (shown as "Empty" in FIG. 5). In FIG. 5, a ranging slot number is shown in each ranging slot, which contains a ranging code.

A mobile station transmits a ranging code by use of one of the ranging slots. As a general principle, the mobile station randomly selects a ranging code and a ranging slot.

In step S7, the base station 12 having received the ranging code broadcasts a ranging response message (RNG-RSP) to request the adjustment of timing and transmission power level (time/power corrections) to the mobile station 1. The mobile station 1 can determine whether it is the intended recipient of the broadcast RNG-RSP by checking an "original ranging frame/code/slot" contained in the RNG-RSP. The "ranging frame" indicates 8 LSBs (least significant bits) of the frame number of the frame that is used by the mobile station to transmit the ranging code. The "ranging code" indicates the index value of the ranging code transmitted by the mobile station. The "ranging slot" indicates the subchannel logical number and symbol number of the ranging slot that is used by the mobile station to transmit the ranging code. By checking these parameters, the mobile station determines whether it is the intended recipient of the broadcast RNG-RSP.

In step S8, the base station 12 having received the ranging code broadcasts a CDMA_Allocation_IE that is one of the information elements in the UL-MAP, thereby allocating a bandwidth of the UL to the mobile station 1. The UL-MAP is comprised of various types of information elements. The mobile station 1 can determine whether it is the intended recipient of the broadcast CDMA_Allocation_IE by checking an "original ranging frame/code/slot" contained in the CDMA_Allocation_IE.

In step S9, the mobile station 1 transmits a ranging request message (RNG-REQ) inclusive of its own MAC Address to the base station 12 by utilizing the bandwidth allocated in step S8 to the UL burst. This RNG-REQ is transmitted by using the UL burst rather than using a ranging region.

In step S10, the base station 12 transmits a RNG-RSP inclusive of the MAC Address of the mobile station 1, thereby allocating a Basic/Primary CID (Connection ID) to the mobile station 1.

In step S11 and subsequent steps, network entry processing for the mobile station 1 will be performed by exchanging various control messages by use of the above-noted Basic/Primary CID.

FIG. 3 described above shows the procedure for handover initiated by a mobile station (i.e., MS Initiated HO). As another procedure, there is a procedure for handover initiated by a network (i.e., Network Initiated HO). In the case of network-initiated handover, MOB_MSHO-REQ in step S1 is nonexistent, and a base station transmits an MOB_BSHO-REQ (i.e., handover request) to a mobile station in place of the MOB_BSHO-RSP transmitted in step S3. Other than these changes, the procedure for handover is the same as the procedure for mobile-station-initiated handover. It should particularly be noted that the ranging process is exactly the same.

FIG. 4 is a drawing showing the procedure for related-art bandwidth request ranging in the case of handover canceling. A description of the points that are the same as in FIG. 3 will be omitted. Steps S1 through S5 of FIG. 4 are the same as those shown in FIG. 3.

In step S6, the mobile station 2 transmits a bandwidth request ranging code during a ranging slot of a ranging region shown in FIG. 1 to the base station 11. The mobile station 2 is about to return to the base station 11 upon canceling handover to the base station 12. The base station 11 has started Resource Retain Timer upon receiving the handover indication (MOB_HO-IND), and retains the contexts regarding the mobile station 2 until the timer expires. Before the timer expires, thus, the mobile station 2 can return to the base station 11 by transmitting a handover cancel message as will later be described in connection with step S10. In this case, an initial connection procedure that is typically required does not have to be performed.

In step S7, the base station 11 transmits CDMA_Allocation_IE, thereby allocating a bandwidth of a UL burst to the mobile station 2.

In step S8, the mobile station 2 utilizes the allocated bandwidth of a UL burst to transmit a bandwidth request required to transmit a handover cancel message. There is no need to transmit this bandwidth request if a bandwidth sufficient for transmitting a handover cancel message is already allocated in step S7. The base station 11 needs to allocate, through the CDMA_Allocation_IE, a bandwidth sufficient to transmit a bandwidth request, but there is no guarantee that a wider bandwidth is allocated.

In step S9, the base station 11 allocates a bandwidth of a UL burst to the mobile station 2 through UL-MAP_IE.

In step S10, the mobile station 2 utilizes the allocated bandwidth to transmit a handover cancel message (MOB_HO-IND (HO_IND_type=HO cancel)).

In step S11, the base station 11, the base station 12, and the control apparatus 21 exchange backbone messages to perform cancel processing in the network. With this, the returning of the mobile station 2 to the base station 11 is completed.

Japanese Patent Application Publication No. 2007-504747 discloses allocating a ranging code on a ranging-purpose-specific basis as previously described and allocating a UL burst bandwidth preferentially for HO ranging, for example, thereby increasing the speed of handover process.

Japanese Patent Application Publication No. 2003-318859 discloses determining the number of ranging codes and backoff value assigned on a ranging-purposes-specific basis in response to congestion level in the network.

Japanese Patent Application Publication No. 2006-5946 discloses a target base station that transmits a Fast_Ranging_IE to a mobile station to allocate a bandwidth for the mobile station to transmit a RNG-REQ message.

A ranging code and a ranging slot are randomly selected in the related-art CDMA-based ranging scheme. Contention thus occurs if another mobile station selects the same ranging code and the same ranging slot.

In the case of the occurrence of contention, a mobile station detects the occurrence of contention based on whether a retransmission timer expires, and, then, waits for the passage of a back-off time by applying the back-off algorithm defined in IEEE802.16e, followed by retransmitting the ranging code. Such procedure results in a delay in handover process. FIG. 6 is a drawing showing a related-art procedure for handover ranging in the case of occurrence of contention. For the sake of convenience, the same step numbers are used in FIG. 3 and FIG. 6.

By the same token, the procedure for bandwidth request ranging suffers a problem in that the handover cancel process is delayed upon the occurrence of contention between the mobile station 2 and the mobile station 3 shown in FIG. 2, for example.

The method disclosed in Japanese Patent Application Publication No. 2007-504747 can increase the speed of handover process if no contention occurs, but cannot prevent the occurrence of contention.

The method disclosed in Japanese Patent Application Publication No. 2003-318859 can reduce the number of the occurrences of contention, but cannot prevent the occurrence of contention.

The method disclosed in Japanese Patent Application Publication No. 2006-5946 transmits a RNG-REQ message of step S9 without performing CDMA-based ranging shown in FIG. 3, thereby increasing the speed of handover process. In order to use this method, however, the mobile station needs to perform a process called "association" with the target mobile station while the mobile station is still connected to the serving base station to receive an instruction for time/power corrections from the target mobile station. There is also a need that this instruction be not yet expired while the mobile station is still connected to the base station. Further, the "association" function is optional in the Mobile WiMAX System Profile. It is thus highly probable that a mobile station and a base station are not provided with this function.

Accordingly, there is a need for a base station of a mobile communication system that can prevent the occurrence of contention associated with handover ranging and bandwidth request ranging.

SUMMARY OF THE INVENTION

In at least one embodiment, a base station of a mobile communication system which allocates a bandwidth for handover ranging or bandwidth request ranging in response to a code transmitted from a mobile station that is selected by the mobile station from a plurality of codes includes a ranging allocating unit configured to allocate, to a mobile station performing handover, at least one of a dedicated ranging code and a dedicated ranging slot that are exclusively used and not used by any mobile stations other than the mobile station, and that are provided separately for each of a plurality of base stations to which the mobile station is to be possibly connected.

According to at least one embodiment, the occurrence of contention associated with handover ranging and bandwidth request ranging can be prevented, thereby overcoming the problem of delays in the handover process or the handover cancel process.

BRIEF DESCRIPTION OF THE DRAWINGS

Other objects and further features of the present invention will be apparent from the following detailed description when read in conjunction with the accompanying drawings, in which:

FIG. 10 is a drawing showing the format of a handover response message according to the first embodiment;

FIG. 11 is a drawing showing the format of Ranging Region Allocation_IE in a UL-MAP according to the first embodiment;

FIG. 13 is a drawing showing the format of an allocation message according to the second embodiment; and FIG. 14 is a drawing showing the procedure for handover ranging according to a third embodiment.

DESCRIPTION OF THE PREFERRED EMBODIMENTS

In the following, embodiments of the present invention will be described with reference to the accompanying drawings.

<Functional Blocks of Base Station and Mobile Station>

Figure 7:
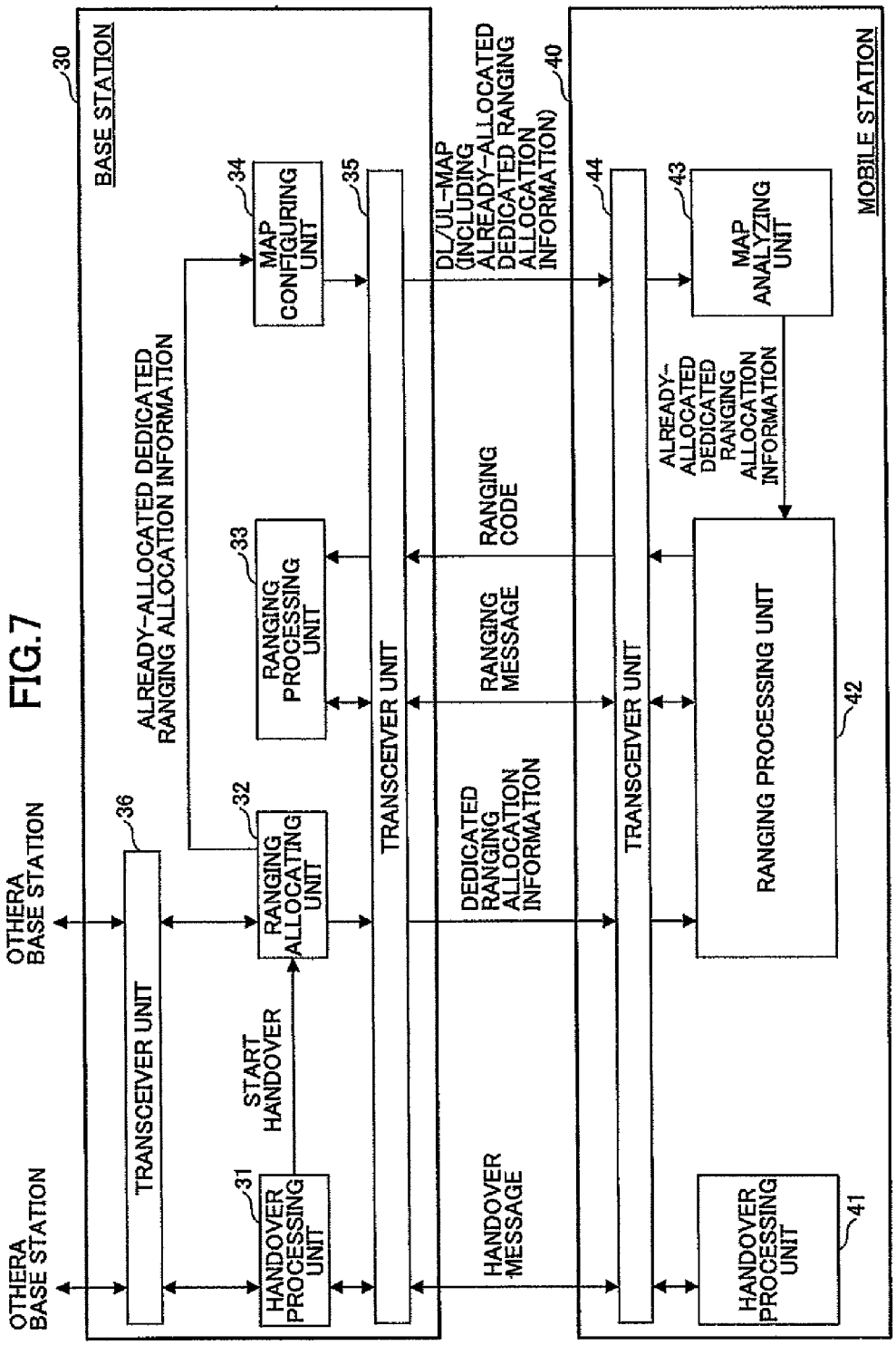
FIG. 7 is a functional block diagram of a base station and a mobile station.

FIG. 7 is a functional block diagram of a base station and a mobile station. A base station 30 includes a handover processing unit 31, a ranging allocating unit 32, a ranging processing unit 33, a map configuring unit 34, and transceiver units 35 and 36. A mobile station 40 includes a handover processing unit 41, a ranging processing unit 42, a map analyzing unit 43, and a transceiver unit 44.

The handover processing units 31 and 41 of the base station 30 and the mobile station 40 exchange handover messages with each other via the transceiver units 35 and 44. Further, the handover processing unit 31 notifies the ranging allocating unit 32 of a start of handover.

The ranging allocating unit 32 of the base station 30 allocates dedicated ranging allocation information dedicated for a mobile station, and transmits this allocation information to the ranging processing unit 42 of the mobile station 40. In performing allocation, the ranging allocating unit 32 communicates with a target base station via the transceiver unit 36, and acquires dedicated ranging allocation information available in the target base station. The ranging allocating unit 32 then combines this dedicated ranging allocation information with dedicated ranging allocation information available in the base station 30 for transmission to the ranging processing unit 42 of the mobile station 40 via the transceiver units 35 and 44. Further, the ranging allocating unit 32 transmits, to the map configuring unit 34, the dedicated ranging allocation information that is available in the local base station 30 and already allocated.

The map configuring unit 34 configures a DL/UL-MAP containing the already-allocated dedicated ranging allocation information for broadcasting to the mobile station 40.

The map analyzing unit 43 of the mobile station 40 analyzes the received DL/UL-MAP, and transmits the already-allocated dedicated ranging allocation information to the ranging processing unit 42 of the mobile station 40. With this arrangement, it is possible for a mobile station, which is not allocated with dedicated ranging allocation information, to avoid performing a ranging process using dedicated ranging allocation information already allocated to another mobile station. Namely, exclusion control is attained.

The ranging processing unit 42 of the mobile station 40 utilizes the dedicated ranging allocation information allocated to the mobile station 40 to transmit a ranging code to the base station 30 and to exchange ranging messages with the base station 30. In this manner, the ranging processing unit 42 performs a ranging process.

In this arrangement, the ranging allocating unit 32 of the base station 30 transmits dedicated ranging allocation information dedicated for use by a mobile station to this mobile station. In this manner, the ranging allocating unit 32 allocates, for dedicated use by this mobile station, a ranging code, a ranging slot, and an effective frame set indicative of a period during which the ranging code and the ranging slot are effective. The dedicated ranging allocation information may include a ranging code, a ranging slot, and an effective frame set. It should be noted, however, that it suffices to have at least one of the ranging code and the ranging slot.

First Embodiment

In the first embodiment, dedicated ranging allocation information for use by a mobile station to perform handover is allocated to this mobile station through a handover response message (MOB_BSHO-RSP) in the case of MS Initiated HO. In the first embodiment, dedicated ranging allocation information for use by a mobile station to perform handover is allocated to this mobile station through a handover request message (MOB_BSHO-REQ) in the case of Network Initiated HO.

Figure 8:
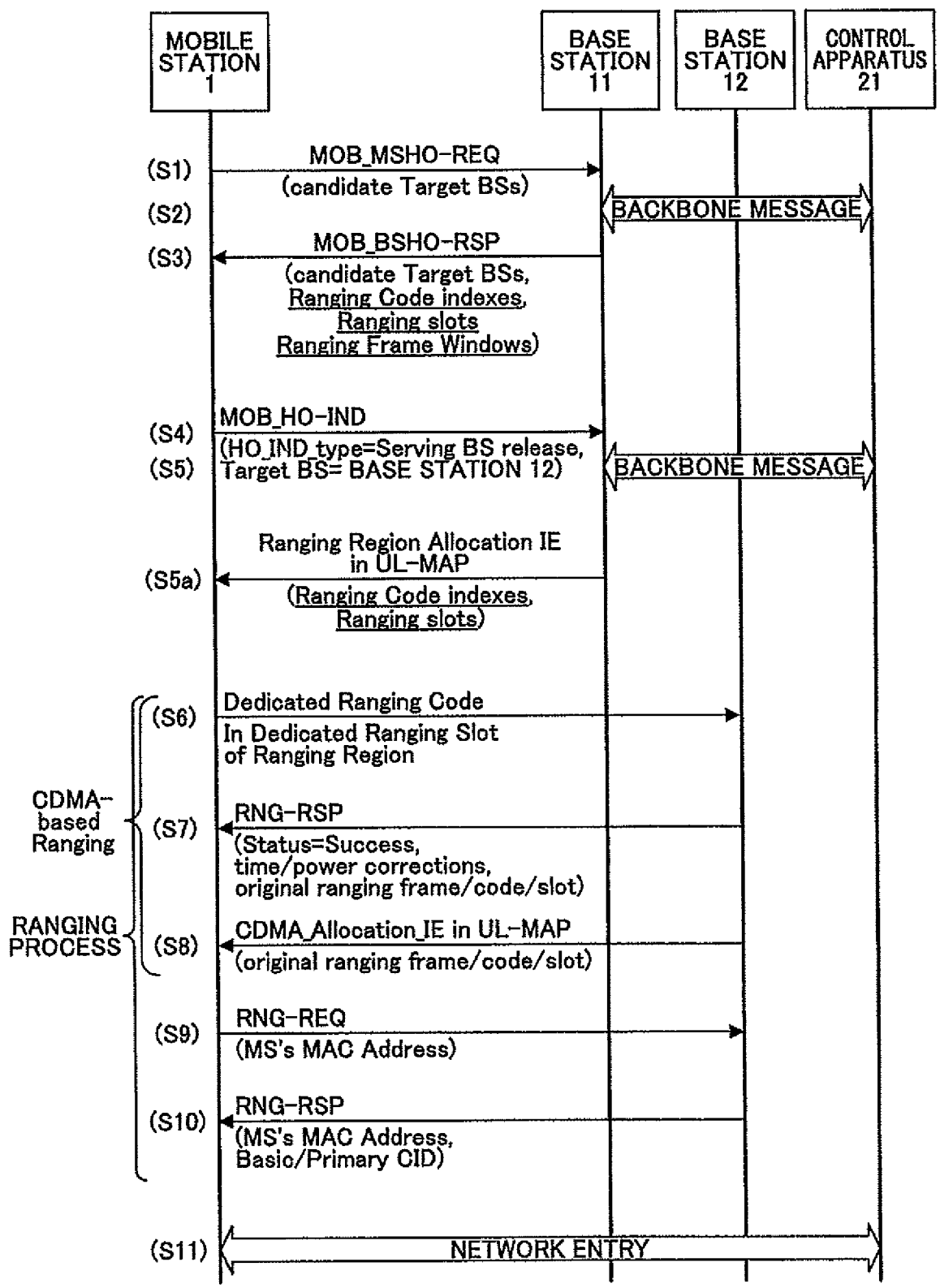
FIG. 8 is a drawing showing the procedure for handover ranging according to a first embodiment.

FIG. 8 is a drawing showing the procedure for handover ranging according to the first embodiment.

In step S1, the mobile station 1 transmits a handover request (i.e., MOB_MSHO-REQ message) including an indication of a plurality of candidate target base stations to the base station 11.

In step S2, the base station 11, the control apparatus 21, and the base station 12 exchanges required backbone messages upon receiving the handover request.

In step S3, the base station 11 transmits a handover response (MOB_BSHO-RSP) to the mobile station 1. Attached to this handover response is a set of information including a ranging code index, a ranging slot, and an effective frame set (Ranging Frame Window) indicative of a period during which these ranging index code and ranging slot are effective in the base station 11. A further set of information with respect to each candidate target base station is also attached to the handover response. This further set of information includes a ranging code index, a ranging slot, and an effective frame set (Ranging Frame Window) indicative of a period during which these ranging index code and ranging slot are effective in the candidate target base station.

Upon performing the handover, the mobile station 1 needs to send a ranging code to a target base station. In order to send a ranging code to the target base station, the mobile station 1 uses the dedicated ranging code and the dedicated ranging slot allocated (and available) for this target base station as specified in the set of information that is attached to the handover response (MOB_BSHO-RSP). Upon canceling the handover, on the other hand, the mobile station 1 needs to send a ranging code to the serving base station. In order to send a ranging code to the serving base station, the mobile station 1 uses the dedicated ranging code and the dedicated ranging slot allocated (and available) for the serving base station as specified in the set of information that is attached to the handover response (MOB_BSHO-RSP). It should be noted that at least one of the dedicated ranging code and the dedicated ranging slot may be specified (allocated) in the set of information and used by the mobile station to perform ranging.

The effective frame set (Ranging Frame Window) specifies a number of frames to indicate a time period during which the dedicated ranging code and ranging slot are effective. In the case of the serving base station 11, the period indicated by the effective frame set starts at the frame next following the frame at which the handover indication (MOB_HO-IND) is received. In the case of the target base station 12, the period indicated by the effective frame set starts at the frame specified by Action Time included in the handover response message (MOB_BSHO-RSP).

FIG. 10 is a drawing showing the format of the handover response message (MOB_BSHO-RSP) according to the first embodiment. In FIG. 10, a dedicated ranging code and a dedicated ranging slot are specified with respect to each target base station by statements included in the "for" loop that iterates N_Recommended times. Separately from this, a dedicated ranging code and dedicated ranging slot effective in the local base station (i.e., serving base station) are also specified.

In step S4, the mobile station 1 transmits, to the base station 11, a handover indication (i.e., MOB_HO-IND) indicating that the base station 12 is selected as the target base station. In so doing, HO_IND_type of MOB_HO-IND is set to "Serving BS release", so that the connection between the mobile station 1 and the base station 11 will be disconnected.

In step S5, the base station 11, the control apparatus 21, and the base station 12 exchange required backbone messages upon receiving the handover indication. Steps S4 and S5 are the same as those shown in FIG. 3.

In step S5a of this embodiment, the base station 11 broadcasts Ranging Region Allocation_IE (i.e., ranging region allocation message) in the UL-MAP together with dedicated ranging allocation information (i.e., sets of a ranging code index and a ranging slot) already allocated in the local base station (i.e., base station 11). Other mobile stations are prohibited from using this already-allocated dedicated ranging allocation information for ranging. Namely, by referring to this already allocated dedicated ranging allocation information, other mobile stations refrain from using an already allocated ranging code and/or ranging slot for performing a ranging process such as initial ranging, for example. This broadcasting is performed until the above-described effective frame set comes to an end.

FIG. 11 is a drawing showing the format of Ranging Region Allocation_IE in the UL-MAP according to the first embodiment. Ranging Region Allocation_IE specifies a ranging region, and also specifies a plurality of sets of an already-allocated dedicated ranging code and an already-allocated dedicated ranging slot number. The number of sets is N_Allocated_Ranging_Params.

In step S6, the mobile station 1 transmits a dedicated ranging code by use of a dedicated ranging slot to the base station 12. Contention does not occur as previously described.

Figure 3:
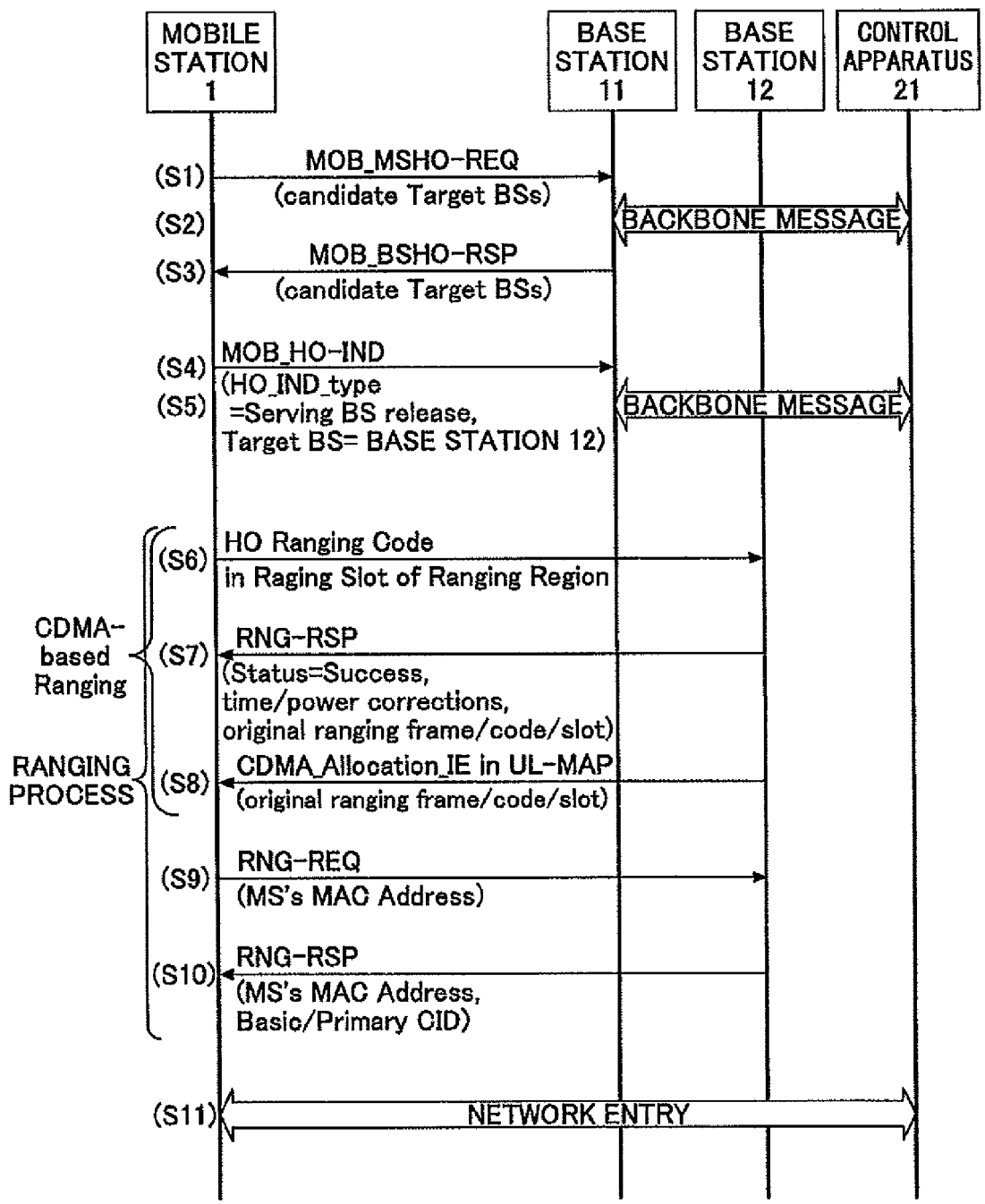
FIG. 3 is a drawing showing the procedure for related-art handover ranging.

Subsequent steps are the same as those shown in FIG. 3.

In step S7, the base station 12 having received the ranging code broadcasts a ranging response message (RNG-RSP) to request the adjustment of timing and transmission power level (time/power corrections) to the mobile station 1. The mobile station 1 can determine whether it is the intended recipient of the broadcast RNG-RSP by checking an "original ranging frame/code/slot" contained in the RNG-RSP. The "ranging frame" indicates 8 LSBs (least significant bits) of the frame number of the frame that is used by the mobile station to transmit the ranging code. The "ranging code" indicates the index value of the ranging code transmitted by the mobile station. The "ranging slot" indicates the subchannel logical number and symbol number of the ranging slot that is used by the mobile station to transmit the ranging code. By checking these, the mobile station determines whether it is the intended recipient of the broadcast RNG-RSP.

In step S8, the base station 12 having received the ranging code broadcasts a CDMA_Allocation_IE that is one of the information elements in the UL-MAP, thereby allocating a bandwidth of the UL to the mobile station 1. The UL-MAP is comprised of various types of information elements. The mobile station 1 can determine whether it is the intended recipient of the broadcast CDMA_Allocation_IE by checking an "original ranging frame/code/slot" contained in the CDMA_Allocation_IE.

In step S9, the mobile station 1 transmits a ranging request message (RNG-REQ) inclusive of its own MAC Address to the base station 12 by utilizing the bandwidth allocated in step S8 to the UL burst. This RNG-REQ is transmitted using the UL burst rather than using a ranging region.

In step S10, the base station 12 transmits a RNG-RSP inclusive of the MAC Address of the mobile station 1, thereby allocating a Basic/Primary CID (Connection ID) to the mobile station 1.

In step S11 and subsequent steps, network entry processing for the mobile station 1 will be performed by exchanging various control messages by use of the above-noted Basic/Primary CID.

Figure 9:
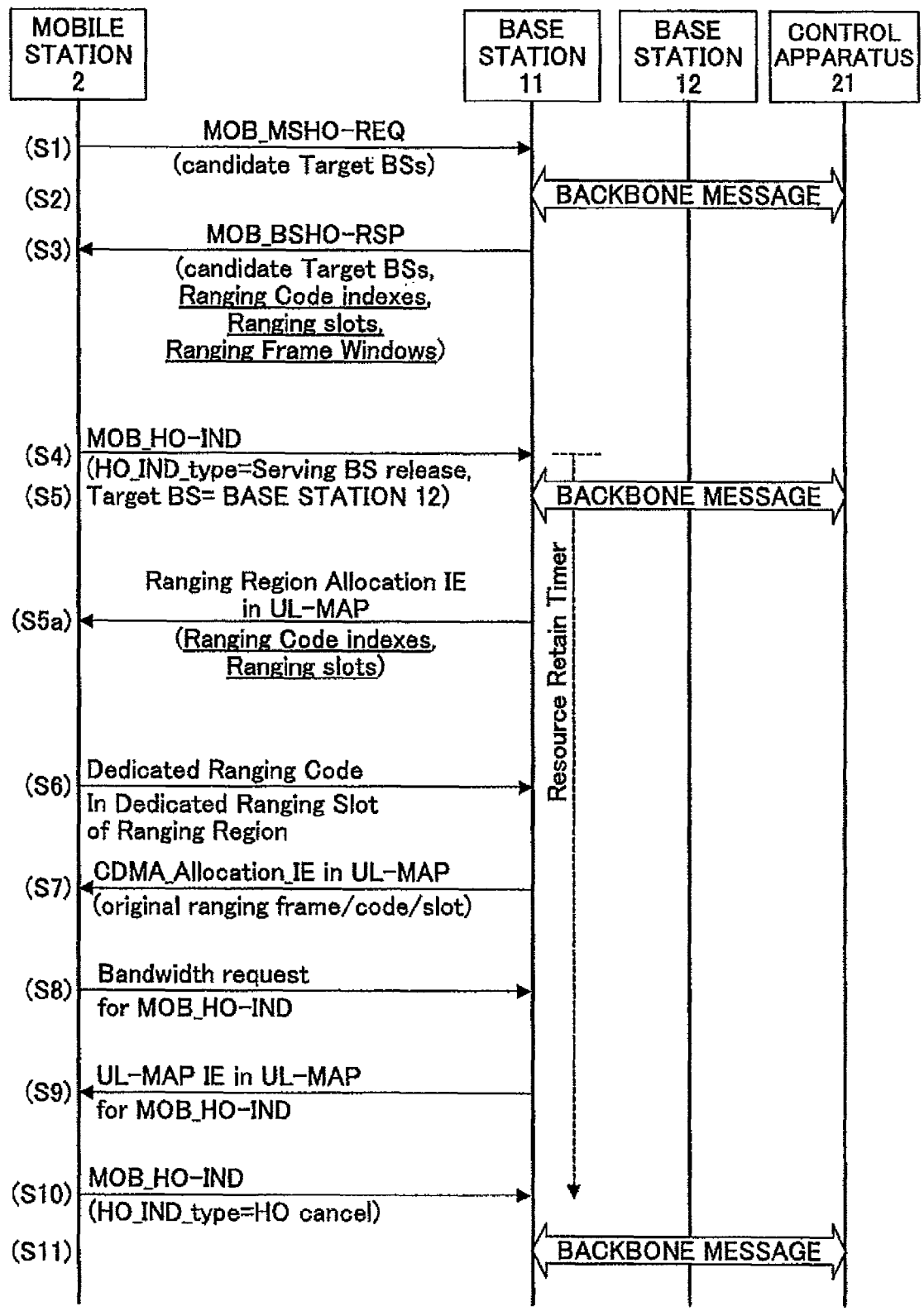
FIG. 9 is a drawing showing the procedure for bandwidth request ranging in the case of handover canceling according to the first embodiment.

FIG. 9 is a drawing showing the procedure for bandwidth request ranging in the case of handover canceling according to the first embodiment. In FIG. 9, step S1 to step S5a are referred to by the same reference numbers as the corresponding steps shown in FIG. 8, and a description thereof will be omitted.

In step S6, the mobile station 2 transmits a dedicated ranging code by use of a dedicated ranging slot to the base station 11.

Dedicated ranging allocation information is allocated in the same manner as in the case of handover ranging described above. In transmitting a ranging code in step S6, thus, no contention occurs.

The base station 11 has started a timer for the purpose of temporarily retaining the contexts regarding a mobile station (i.e., Resource Retain Timer) upon receiving the handover indication (MOB_HO-IND), and retains the contexts regarding the mobile station 2 until this timer expires. Until the timer expires, thus, the mobile station 2 can return to the base station 11 by transmitting a handover cancel message as will later be described in connection with step S10. In this case, an initial connection procedure that is typically required does not have to be performed.

Figure 4:
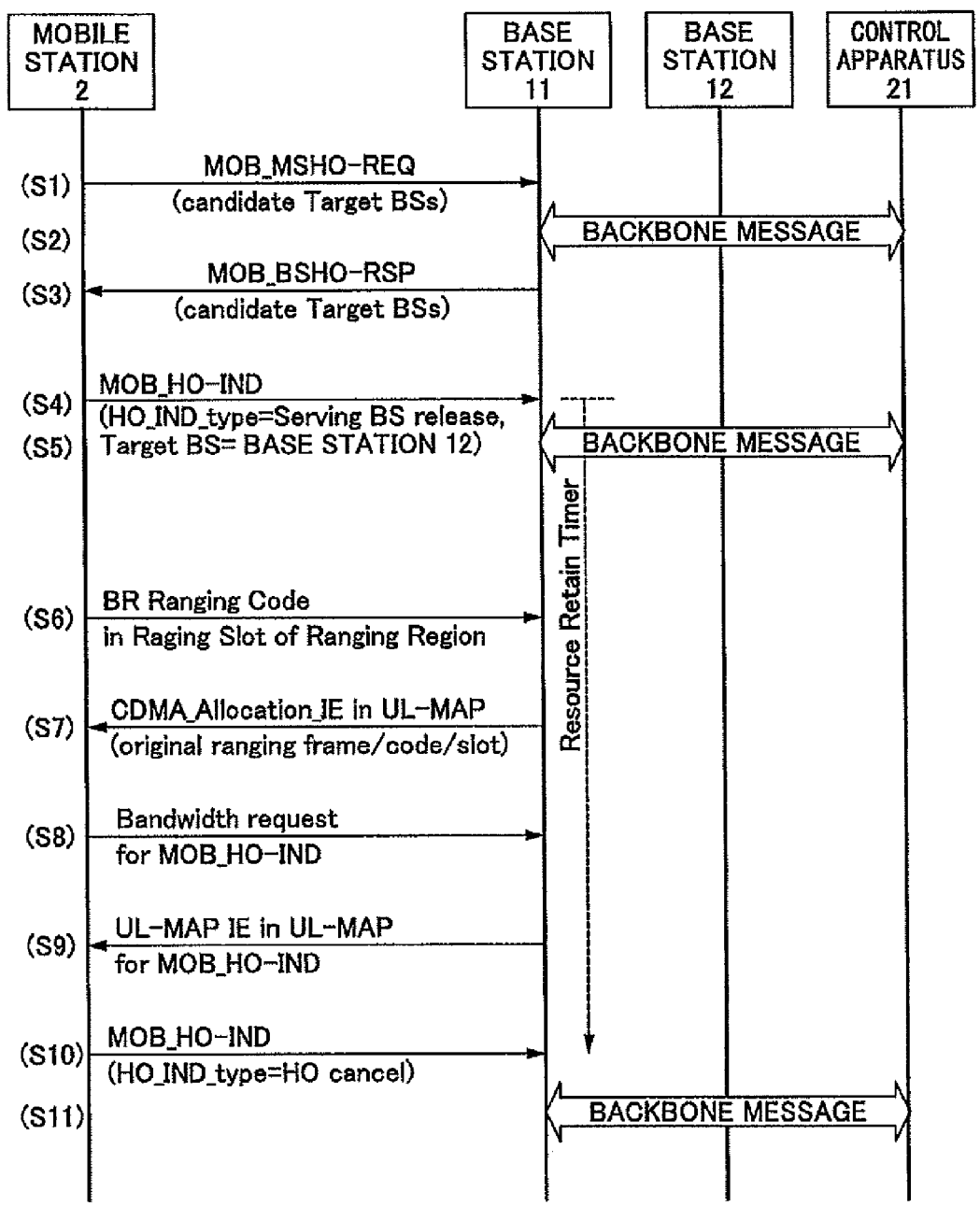
FIG. 4 is a drawing showing the procedure for related-art bandwidth request ranging in the case of handover canceling.
Figure 5:
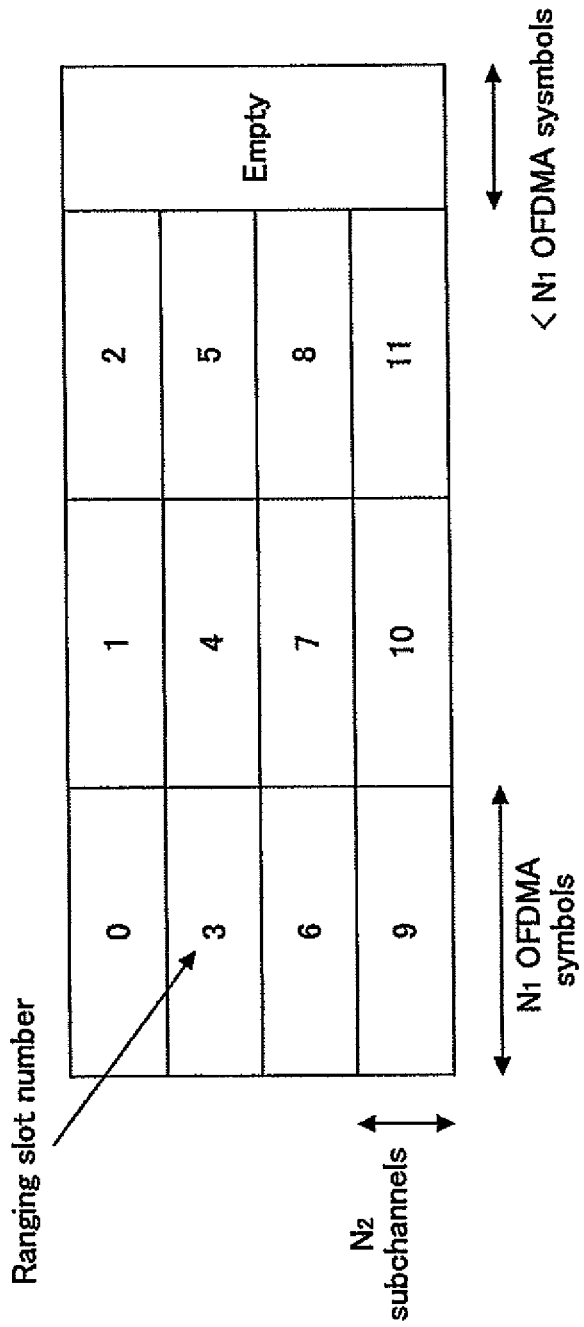
FIG. 5 is a drawing showing an example of the configuration of a ranging region.
Figure 6:
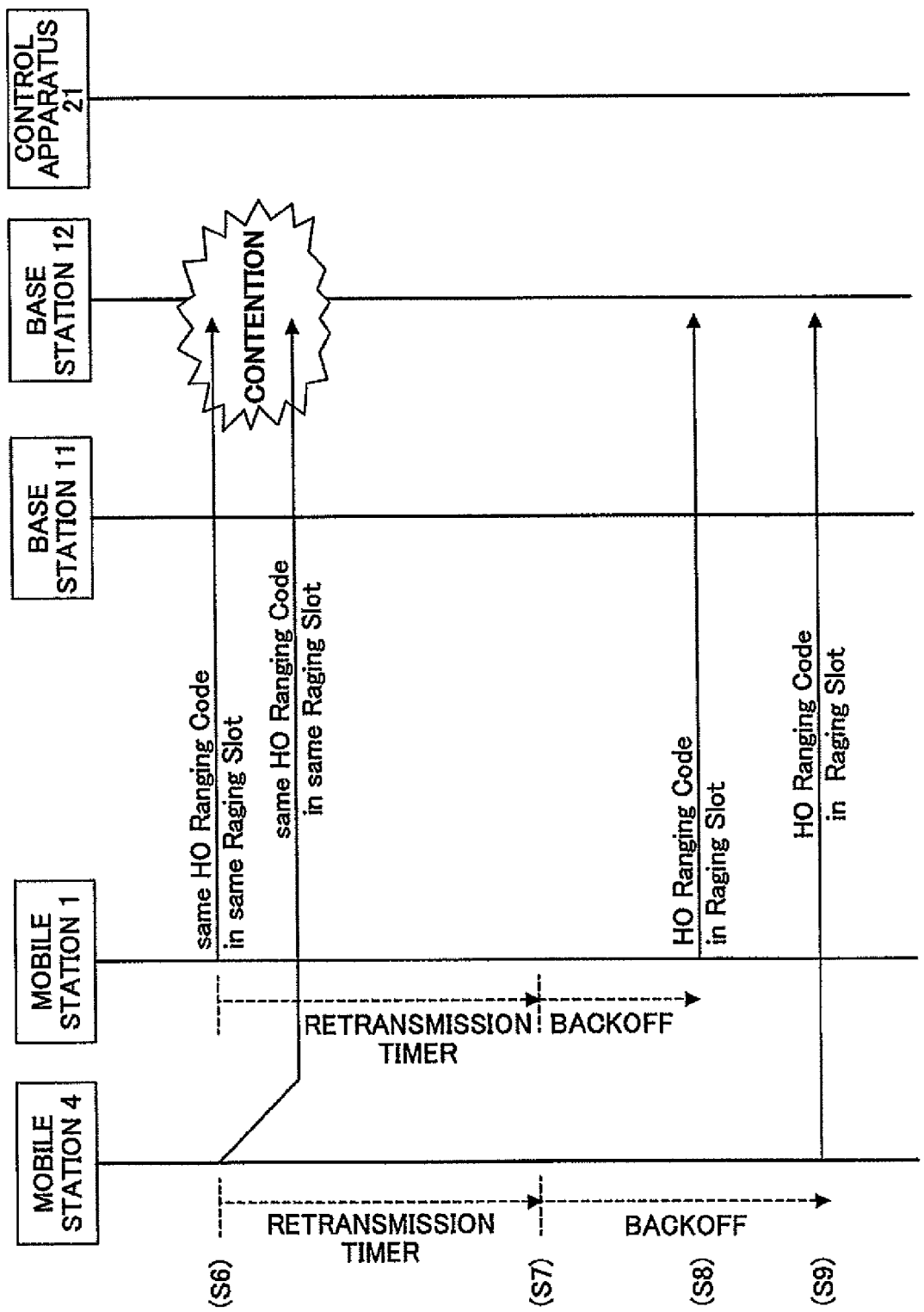
FIG. 6 is a drawing showing a related-art procedure for handover ranging in the case of occurrence of contention.

Subsequent steps are the same as those shown in FIG. 4.

In step S7, the base station 11 transmits CDMA_Allocation_IE, thereby allocating a bandwidth of a UL burst to the mobile station 2.

In step S8, the mobile station 2 utilizes the allocated bandwidth of a UL burst to transmit a bandwidth request required to transmit a handover cancel message. There is no need to transmit this bandwidth request if a bandwidth sufficient for transmitting a handover cancel message is already allocated in step S7. The base station 11 needs to allocate, through the CDMA_Allocation_IE, a bandwidth sufficient to transmit a bandwidth request, but there is no guarantee that a wider bandwidth is allocated.

In step S9, the base station 11 allocates a bandwidth of a UL burst to the mobile station 2 through UL-MAP_IE.

In step S10, the mobile station 2 utilizes the allocated bandwidth to transmit a handover cancel message (MOB_HO-IND (HO_IND_type=HO cancel)).

In step S11, the base station 11, the base station 12, and the control apparatus 21 exchange backbone messages to perform cancel processing in the network. With this, the returning of the mobile station 2 to the base station 11 is completed.

In FIG. 3 and FIG. 9 according to this embodiment, both the dedicated ranging code and the dedicated ranging slot are allocated. Alternatively, only one of these may be allocated. When only a dedicated ranging code is allocated, this ranging code can only be used by a single mobile station throughout all the ranging slots. This results in fewer choices. For the purpose of simplifying the process, however, only a dedicated ranging code may be allocated. By the same token, when only a dedicated ranging slot is allocated, this ranging slot can only be used by a single mobile station. This results in fewer choices. For the purpose of simplifying the process, however, only a dedicated ranging slot may be allocated.

Figure 1:
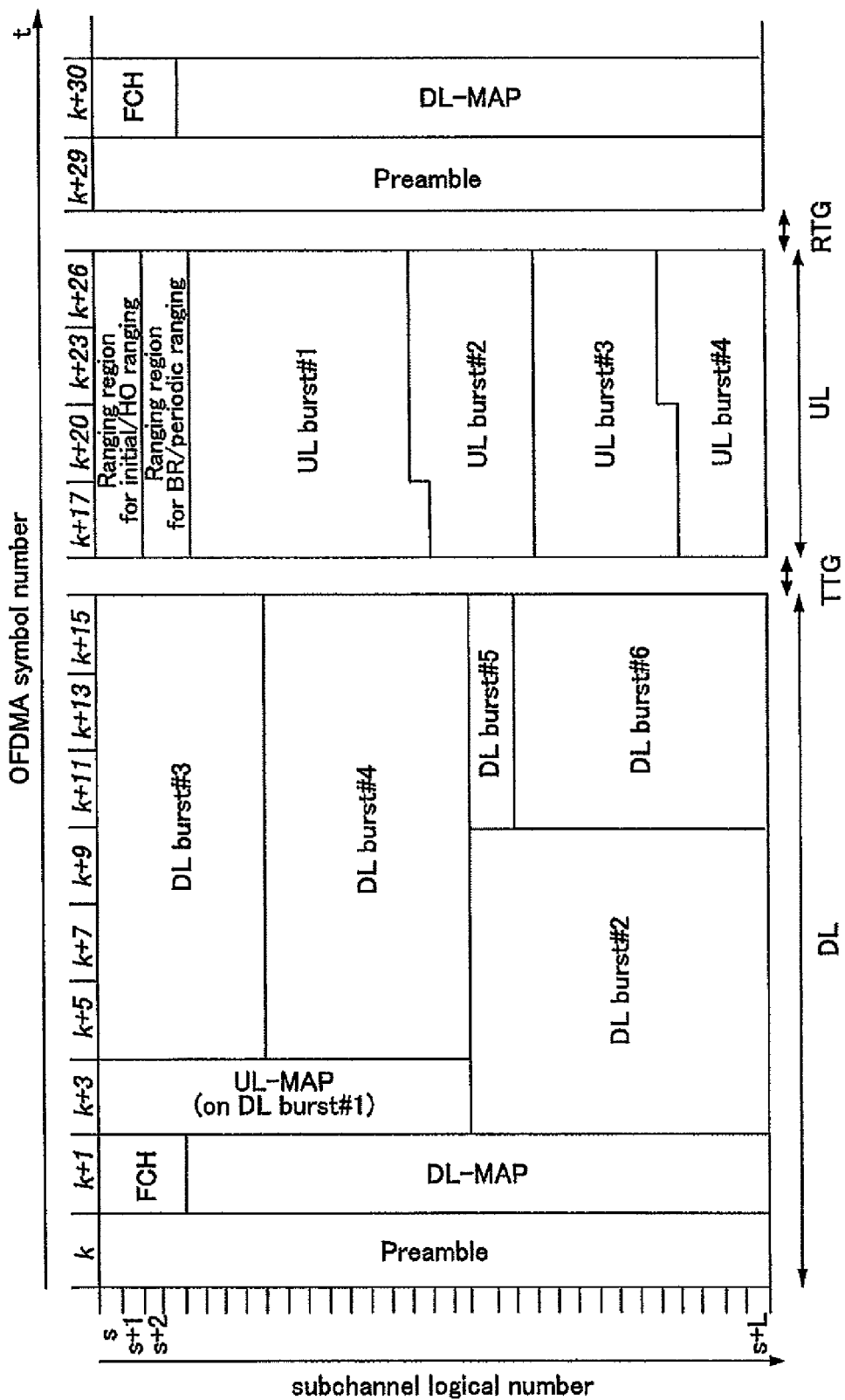
FIG. 1 is a drawing showing an example of a frame configuration for an OFDMA physical layer.
Figure 2:
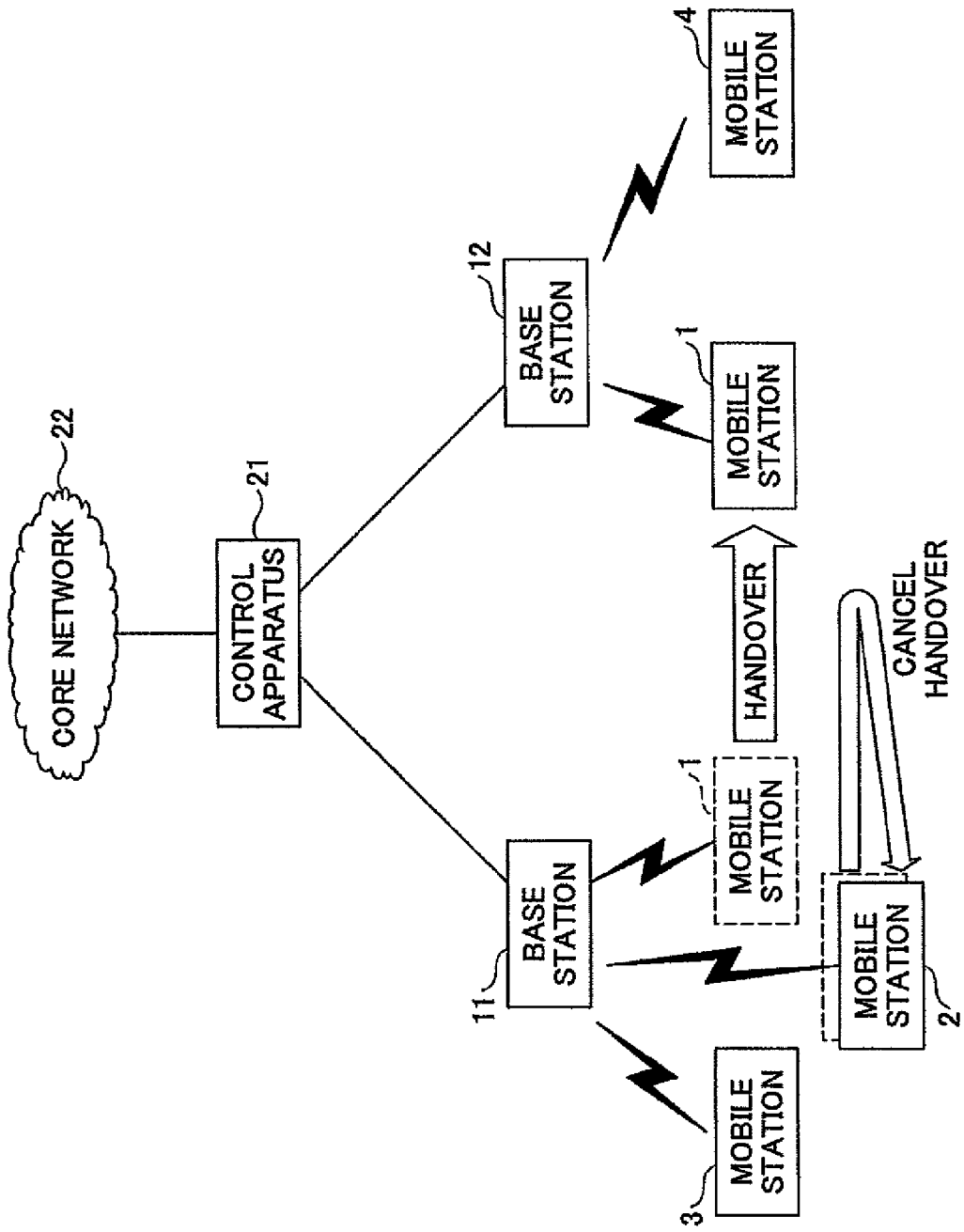
FIG. 2 is a drawing showing the configuration of a typical network.

The present embodiment shown in FIG. 8 and FIG. 9 is directed to a case in which a ranging region is shared by the mobile stations having dedicated ranging allocation information assigned thereto and other mobile stations to which dedicated ranging allocation information is not assigned. Alternatively, a ranging region for use by the mobile stations having dedicated ranging allocation information assigned thereto may be provided separately from the ranging regions shown in FIG. 1. In such a case, this dedicated ranging region will only be used by the mobile stations having dedicated ranging allocation information assigned thereto. There is thus no need to broadcast the dedicated ranging allocation information already allocated in the local base station as in step S5a of FIG. 8 as such broadcasting is only intended to warn the mobile stations to which dedicated ranging allocation information is not assigned. It suffices for the base station to attend to coordination between mobile stations to which dedicated ranging allocation information is allocated.

The embodiment shown in FIG. 8 and FIG. 9 is directed to a mobile-station-initiated handover. In the case of a network-initiated handover, a handover request message (MOB_B-SHO-REQ) is used for allocation in place of the handover response message (MOB_BSHO-RSP). Other details are the same as those in the case of mobile-station-initiated handover.

In this embodiment, further, an effective frame set (Ranging Frame Window) has been used to specify a period during which allocated information is effective. Alternatively, the effective period may be specified as a timer count indicated at the time of initial setting or at the time of message exchange associated with initial establishment of connection. With such arrangement, information regarding an effective period need not be exchanged when handover is to be performed.

In this embodiment, further, dedicated ranging allocation information for dedicated use by a mobile station is attached to a handover response message (MOB_BSHO-RSP) or a handover request message (MOB_BSHO-REQ). Alternatively, such allocation information may be sent to the mobile station as a separate message.

In the procedure for bandwidth request ranging in the case of canceling handover according to the present embodiment, the period (as indicated by the effective frame set) during which the dedicated ranging allocation information is effective may typically be set equal to the time indicated by the Resource Remain Timer during which the base station retains the contexts of a mobile station that is to perform handover. This is because the base station discards the contexts of the mobile station upon expiration of the Resource Retain Timer. After such an event, the mobile station cannot return to the base station 11 simply by transmitting a handover cancel message.

Alternatively, the period during which dedicated ranging allocation information is effective may be set longer than (e.g., twice as long as) the time specified by the Resource Retain Timer. In such a case, the dedicated ranging allocation information may be used for initial ranging from the expiration of the Resource Retain timer to the end of the effective period of the dedicated ranging allocation information. This serves to prevent contention associated with CDMA-based ranging performed as initial ranging.

With this arrangement, a base station can allocate to a mobile station to perform handover an exclusive and dedicated ranging code that is not used by other mobile stations.

Second Embodiment

In the second embodiment, dedicated ranging allocation information for dedicated use by a mobile station to perform handover is allocated to this mobile station by the base station 11 transmitting a newly-provided allocation message to the mobile station immediately after receiving a handover indication (MOB_HO-IND).

The handover indication (MOB_HO-IND) is transmitted after only one target base station is selected. Because of this, the use of a newly-provided allocation message immediately after a handover indication offers an advantage of reduced message size as compared with the use of a handover response message (MOB_BSHO-RSP) or a handover request message (MOB_BSHO-REQ) for the purpose of allocation.

According to the specification of IEEE802.16e, a mobile station is required to receive several frames after transmitting a handover indication (MOB_HO-IND). This specification is utilized to transmit the newly-provided allocation message.

Figure 12:
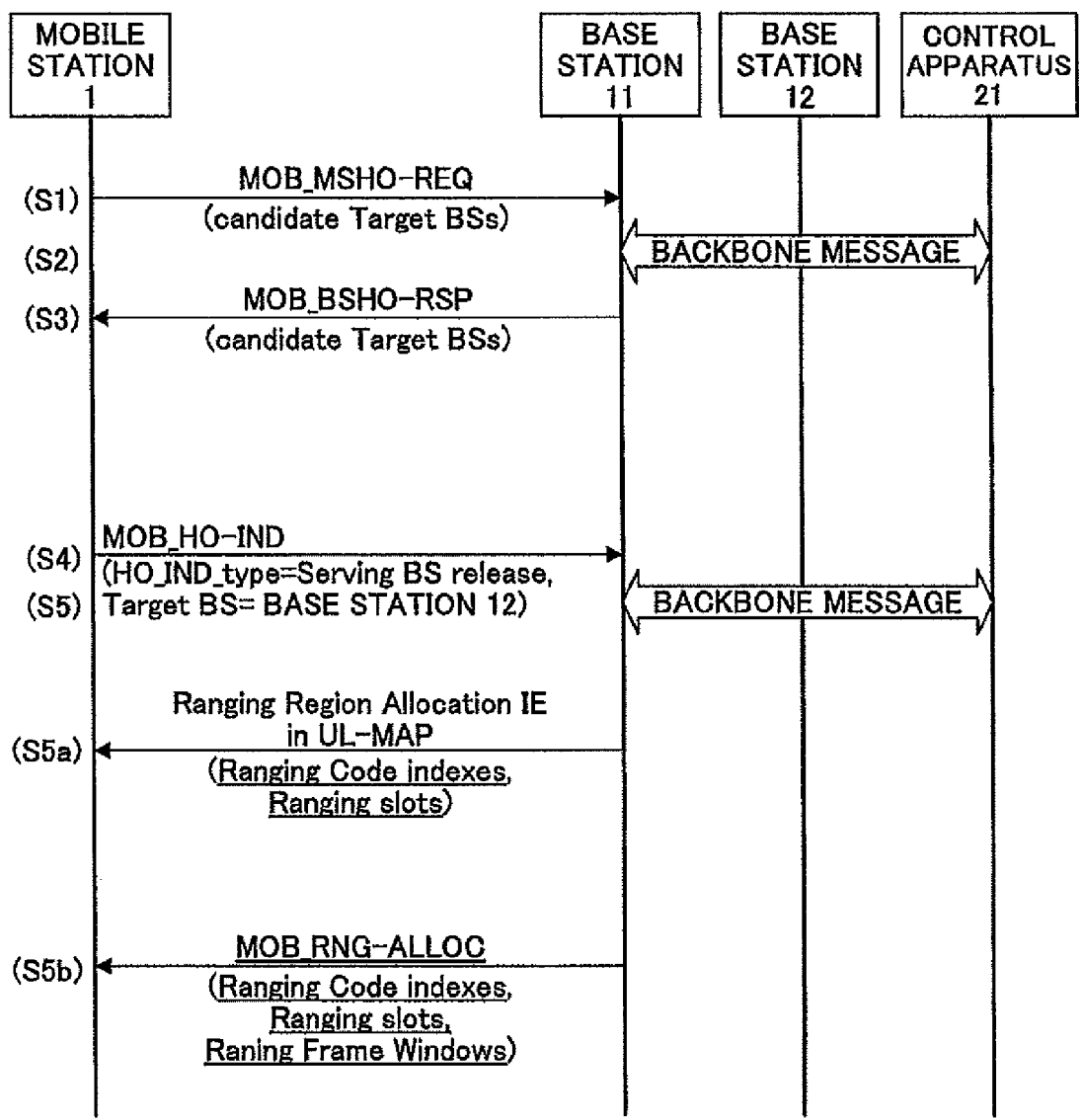
FIG. 12 is a drawing showing the procedure for allocating dedicated ranging allocation information according to a second embodiment.

FIG. 12 is a drawing showing the procedure for allocating dedicated ranging allocation information according to the second embodiment.

FIG. 12 differs from FIG. 8 in that in step S3, the base station 11 transmits MOB_BSHO-RSP without a set of information including a ranging code index, a ranging slot, and an effective frame set (Ranging Frame Window) indicative of a period during which these ranging index code and ranging slot are effective in the base station 11. Further, this handover response is transmitted without a further set of information for each candidate target base station including a ranging code index, a ranging slot, and an effective frame set (Ranging Frame Window) indicative of a period during which these ranging index code and ranging slot are effective.

In this embodiment, at least one of a dedicated ranging code and a dedicated ranging slot may be allocated.

In step S5a after the receipt of the handover indication (MOB_HO-IND) of step S4, the base station 11 broadcasts Ranging Region Allocation_IE (i.e., ranging region allocation message) in the UL-MAP together with dedicated ranging allocation information (i.e., sets of a ranging code index and a ranging slot) already allocated in the local base station (i.e., base station 11).

In step S5b, the newly-provided allocation message (MOB_RNG-ALLOC: Ranging Allocation) is transmitted to allocate the dedicated ranging allocation information to the mobile station.

FIG. 13 is a drawing showing the format of the allocation message (MOB_RNG-ALLOC) according to the second embodiment. The allocation message (MOB_RNG-ALLOC) differs from the handover response message (MOB_BSHO-RSP) of FIG. 10 in that its message size is small. This is because the number (N_Recommended) of target base stations is not plural, but is singular in the allocation message.

Third Embodiment

According to the third embodiment, the serving base station allocates to a mobile station that is to perform handover dedicated ranging allocation information corresponding to this serving base station for dedicated use by this mobile station. The dedicated ranging allocation information corresponding to target base stations, however, is allocated to the mobile station by these target base stations.

A target base station allocates dedicated ranging allocation information to the mobile station only when the mobile station does not have effective ranging parameters (e.g., timing and transmission power level adjustment settings (i.e., time/power correction settings)) with respect to the target base station.

Whether the mobile station has effective ranging parameters is reported to the target base station through a handover indication message (MOB_HO-IND). This arrangement offers an advantage in that dedicated ranging allocation information corresponding to a target base station is allocated only to a mobile station that requires CDMA-based ranging.

In order for a mobile station to have effective ranging parameters (e.g., timing and transmission power level adjustment settings (i.e., time/power correction settings)) with respect to a target base station, the mobile station needs to perform a process called "association" with the target mobile station to receive an instruction for time/power corrections while the mobile station is still connected to the serving base station. There is also a need that this instruction be not yet expired.

FIG. 14 is a drawing showing the procedure for handover ranging according to the third embodiment.

Unlike the first embodiment shown in FIG. 8, in step S3 of FIG. 14, the base station 11 transmits only a set of information including a dedicated ranging code, a dedicated ranging slot, and an effective frame set that are effective with respect to the base station 11. That is, the base station 11 does not transmit dedicated ranging allocation information regarding a plurality of candidate target base stations.

In step S4, the mobile station 1 uses RPVI (Ranging Rarams Valid Indication) to indicate whether the mobile station 1 has effective ranging parameters (e.g., timing and transmission power level adjustment settings (i.e., time/power correction settings)) with respect to the target base station (i.e., the base station 12). In the example shown in FIG. 14, no such effective parameters are in possession.

In step S5, the target base station 12 learns from the base station 11 via a backbone message that the mobile station 1 does not have effective ranging parameters.

In step S5c, the target base station 12 transmits a Fast_Ranging_IE (i.e., fast ranging message) in the UL-MAP with an attached set of information including a dedicated ranging code, a dedicated ranging slot, and an effective frame set with respect to the mobile station 1. This serves to allocate dedicated ranging allocation information for dedicated use by the mobile station 1.

In this embodiment, at least one of a dedicated ranging code and a dedicated ranging slot may be allocated.

The Fast_Ranging_IE is designed in IEEE802.16e to be used for the purpose of omitting a CDMA-based ranging process by allocating a bandwidth for RNG-REQ of step S9. Nonetheless, when the mobile station 1 does not have effective ranging parameters, the Fast_Ranging_IE can be utilized to allocate dedicated ranging allocation information as in step S5c.

Step S6 and subsequent steps are the same as those shown in FIG. 8, and a description thereof will be omitted.

Although the Fast_Ranging_IE is utilized in the third embodiment, another IE may be newly defined. Such newly-defined IE may be used by a target base station to allocate dedicated ranging allocation information.

According to at least one of the embodiments described heretofore, a base station can allocate to a mobile station that is to perform handover an exclusive and dedicated ranging code, ranging slot, and effective frame set that are not being used by other mobile stations. This offers an advantage in that the occurrence of contention is prevented. The prevention of contention occurrence serves to overcome the problem that a handover process or handover cancel process is delayed.

Further, at least one of these embodiments offers an advantage in that the provision of a dedicated ranging region in a frame eliminates the need to broadcast the dedicated ranging allocation information already allocated in the local base station for the purpose of warning other mobile stations to which no dedicated ranging allocation information is assigned.

According to at least one of these embodiments, moreover, the period during which dedicated ranging allocation information is effective for a mobile station performing handover may be set longer than the time specified by the Resource Remain Timer of the serving base station. With this arrangement, the mobile station can use the dedicated ranging allocation information for performing initial ranging, thereby avoiding the occurrence of contention.

According to at least one of these embodiments, only the dedicated ranging allocation information that is effective for a serving base station and a target base station is allocated, thereby reducing the size of an allocation message.

Moreover, at least one of these embodiments offers an advantage in that dedicated ranging allocation information corresponding to a target base station is allocated only to a mobile station that requires CDMA-based ranging with respect to this target base station.

In these embodiments, the ranging allocating unit 32 is used as an example of a ranging allocating unit, and a map configuring unit 34 is used as an example of a broadcasting unit.

Further, the present invention is not limited to these embodiments, but various variations and modifications may be made without departing from the scope of the present invention.

What is claimed is:

1. A base station of a mobile communication system which allocates a bandwidth for handover ranging or bandwidth request ranging in response to a code transmitted from a mobile station that is selected by the mobile station from a plurality of codes, comprising:
   a ranging allocating unit configured to allocate to a mobile station performing handover-cancellation at least one of a dedicated ranging code and a dedicated ranging slot that is exclusively used by the mobile station and not used by any mobile stations other than the mobile station, and that is provided separately for each of a plurality of base stations to which the mobile station is to be possibly connected, wherein a period of an effective state of said at least one of the dedicated ranging code and the dedicated ranging slot is set equal to a time length of a context-retained state in which during which a serving base station retains contexts of the mobile station performing handover-cancellation.

2. The base station as claimed in claim 1, wherein the ranging allocating unit is configured to allocate the period.

3. The base station as claimed in claim 1, wherein the ranging allocating unit is configured to allocate said at least one of the dedicated ranging code and the dedicated ranging slot separately for each of the plurality of base stations including the base station currently serving as a serving base station and candidate target base stations to which the mobile station is to be connected upon handover, and is further configured to transmit said at least one of the dedicated ranging code and the dedicated ranging slot by use of a handover response message or a handover request message.

4. The base station as claimed in claim 1, further comprising a broadcasting unit configured to broadcast to the mobile stations including the mobile station and said any mobile stations other than the mobile station said at least one of the dedicated ranging code and the dedicated ranging slot allocated by the ranging allocating unit.

5. The base station as claimed in claim 4, wherein the broadcasting unit is configured to perform said broadcast by use of a ranging region allocation message in a frame.

6. The base station as claimed in claim 1, wherein the ranging allocating unit is configured to allocate said at least one of the dedicated ranging code and the dedicated ranging slot separately for each of the base station currently serving as a serving base station and a candidate target base station to which the mobile station is to be connected upon handover, and is further configured to transmit said at least one of the dedicated ranging code and the dedicated ranging slot after receiving a handover indication message.

7. The base station as claimed in claim 6, wherein the ranging allocating unit is configured to allocate said at least one of the dedicated ranging code and the dedicated ranging slot separately for each of the base station serving as a serving base station before the handover and a candidate target base station to which the mobile station is to be connected after the handover, and is further configured to transmit said at least one of the dedicated ranging code and the dedicated ranging slot by use of an allocation message.

8. The base station as claimed in claim 1, wherein the ranging allocating unit is configured to allocate and transmit said at least one of the dedicated ranging code and the dedicated ranging slot if the base station is a currently serving base station or a candidate target base station to which the mobile station is to be connected upon handover.

9. The base station as claimed in claim 8, wherein the ranging allocating unit is configured to allocate said at least one of the dedicated ranging code and the dedicated ranging slot if the mobile station does not have an effective ranging parameter and if the base station is a candidate target base station to which the mobile station is to be connected after the handover, and is further configured to transmit said at least one of the dedicated ranging code and the dedicated ranging slot by use of a fast ranging message in a frame.

10. The base station as claimed in claim 2, wherein the ranging allocating unit is configured to set the period substantially equal to a timer count during which the serving base station retains contexts of the mobile station.

* * * * *